United States Patent
Park et al.

(10) Patent No.: US 8,006,124 B2
(45) Date of Patent: Aug. 23, 2011

(54) LARGE-SCALE CLUSTER MONITORING SYSTEM, AND METHOD OF AUTOMATICALLY BUILDING/RESTORING THE SAME

(75) Inventors: Choon-Seo Park, DaeJeon (KR); Song-Woo Sok, DaeJeon (KR); Chang-Soo Kim, DaeJeon (KR); Yoo-Hyun Park, DaeJeon (KR); Yong-Ju Lee, DaeJeon (KR); Jin-Hwan Jeong, Seoul (KR); Hag-Young Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 328 days.

(21) Appl. No.: 12/186,097

(22) Filed: Aug. 5, 2008

(65) Prior Publication Data

US 2009/0150718 A1    Jun. 11, 2009

(30) Foreign Application Priority Data

Dec. 11, 2007    (KR) ........................ 10-2007-0128553

(51) Int. Cl.
*G06F 11/00* (2006.01)
(52) U.S. Cl. ...... 714/4.3; 714/4.11; 714/4.12; 714/4.21; 714/13; 714/47.1
(58) Field of Classification Search ................. 714/4, 13, 714/47, 47.1
See application file for complete search history.

(56) References Cited

U.S. PATENT DOCUMENTS 6,088,727 A * 7/2000 Hosokawa et al. ........... 709/223
6,594,786 B1 * 7/2003 Connelly et al. ................ 714/50
6,718,486 B1 * 4/2004 Roselli et al. ................... 714/41

(Continued)

FOREIGN PATENT DOCUMENTS

KR    2003-0051930    6/2003

(Continued)

OTHER PUBLICATIONS

Xue et al. "AOCMS: An Adaptive and Scalable Monitoring System For LArge-Scale Clusters." Proc. of the 2006 IEEE Asia-Pacific Conf on Services Computing. Dec. 2006.*

(Continued)

*Primary Examiner* — Philip Guyton
(74) *Attorney, Agent, or Firm* — Staas & Halsey LLP

(57) ABSTRACT

Provided are a large-scale cluster monitoring system and a method for automatically building/restoring the same, which can automatically build a large-scale monitoring system and can automatically build a monitoring environment when a failure occurs in nodes. The large-scale cluster monitoring system includes a CM server, a BD server, GM nodes, NA nodes, and a DB agent. The CM server manages nodes in a large-scale cluster system. The DB server stores monitoring information that is state information of nodes in groups. The GM nodes respectively collect the monitoring information that is the state information of the nodes in the corresponding groups to store the collected monitoring information in the DB server. The NA nodes access the CM server to obtain GM node information and respectively collect the state information of the nodes in the corresponding groups to transfer the collected state information to the corresponding GM nodes. The DB agent monitors the monitoring information of the nodes in the groups, which is stored in the DB server, to detect a possible node failure.

1 Claim, 6 Drawing Sheets

U.S. PATENT DOCUMENTS

| | | | |
|---|---|---|---|
| 6,983,317 B1 * | 1/2006 | Bishop et al. | 709/223 |
| 7,287,180 B1 * | 10/2007 | Chen et al. | 714/4 |
| 7,447,940 B2 * | 11/2008 | Peddada | 714/11 |
| 7,480,816 B1 * | 1/2009 | Mortazavi et al. | 714/4 |
| 2007/0206611 A1 * | 9/2007 | Shokri et al. | 370/400 |
| 2008/0201470 A1 * | 8/2008 | Sayama | 709/224 |

FOREIGN PATENT DOCUMENTS

| | | |
|---|---|---|
| KR | 1020050066133 | 6/2005 |

OTHER PUBLICATIONS

Park et al. "The Cluster Monitoring and Controlling Method with Scalable Communication Framework." Proc of the Eighth Intl Conf on High-Performance Computing in Asia-Pacific Region. 2005.*

Matthew L. Massie et al., "The ganglia distributed monitoring system: design, implementation, and experience", Parallel Computing 30 (2004), pp. 817-840.

* cited by examiner

LARGE-SCALE CLUSTER MONITORING SYSTEM, AND METHOD OF AUTOMATICALLY BUILDING/RESTORING THE SAME

CROSS-REFERENCE TO RELATED APPLICATIONS

This application claims priority under 35 U.S.C. §119 to Korean Patent Application No. P2007-128553, filed in Korea on Dec. 11, 2007, the disclosure of which is incorporated herein by reference in its entirety.

BACKGROUND OF THE INVENTION

1. Field of the Invention

The present disclosure relates to a large-scale cluster monitoring system and a method for automatically building/restoring the same, and more particularly, to a large-scale cluster monitoring system and a method for automatically building/restoring the same, which can automatically build a large-scale monitoring system and can automatically build a monitoring environment when a failure occurs in nodes.

This work was supported by the IT R&D program of MIC/IITA. [2007-S-016-01, A Development of Cost Effective and Large Scale Global Internet Service Solution]

2. Description of the Related Art

A related art cluster system generates monitoring information of nodes in a layered fashion to thereby transfer the monitoring information to upper nodes, but there is raised a disadvantage that the monitoring information calnot be smoothly transferred to the upper nodes when a failure occurs in a group node. Accordingly, even when a failure occurs in an upper node collecting the monitoring information of lower nodes, a monitoring system must be stably built to increase the availability of the cluster system.

SUMMARY

Therefore, an object of the present invention is to provide a large-scale cluster monitoring system and a method for automatically building/restoring the same, which can actively handle configuration information at the time of a node failure, thereby increasing the availability of a cluster system, in the cluster system environment.

Another object of the present invention is to provide a large-scale cluster monitoring system and a method for automatically building/restoring the same, which can stably build a monitoring system even when a failure occurs in an upper node collecting the monitoring information of lower nodes, thereby increasing the availability of a cluster system.

Another object of the present invention is to provide a large-scale cluster monitoring system and a method for automatically building/restoring the same, which can automatically build the structure of a monitoring system that forms groups in units of subnets, selects one of the formed groups as a group master node, and connects the remaining nodes of the formed groups to the group master node, thereby transferring a monitoring information to the upper node, in a large-scale cluster system.

Another object of the present invention is to provide a large-scale cluster monitoring system and a method for automatically building/restoring the same, which can treat a monitoring system as error rapidly and automatically when a failure occurs in a node agent node or a group master node to smoothly transfer the monitoring information of a monitoring system to an upper node, thereby increasing the availability of a large-scale cluster system through fast restore.

Another object of the present invention is to provide a large-scale cluster monitoring system and a method for automatically building/restoring the same, which can automatically construct and manage nodes of a cluster environment without the directly intervention of an operator when a failure occurs in nodes collecting monitoring information in a large-scale cluster environment, thereby increasing the availability of nodes.

To achieve these and other advantages and in accordance with the purpose(s) of the present invention as embodied and broadly described herein, a large-scale cluster monitoring system in accordance with an aspect of the present invention includes: a CM server for managing nodes in a large-scale cluster system; a DB server for storing monitoring information that is state information of nodes in groups; a plurality of GM nodes for respectively collecting the monitoring information that is the state information of the nodes in the corresponding groups to store the collected monitoring information in the DB server; a plurality NA nodes for accessing the CM server to obtain GM node information and respectively collecting the state information of the nodes in the corresponding groups to transfer the collected state information to the corresponding GM nodes; and a DB agent for monitoring the monitoring information of the nodes in the groups, which is stored in the DB server, to detect a possible node failure.

To achieve these and other advantages and in accordance with the purpose(s) of the present invention, a method for automatically building/restoring a large-scale cluster monitoring system in accordance with another aspect of the present invention includes: an NA node requesting GM node information; searching for information a group including the requesting NA node; when the GM node is present in the group and operates normally, the requesting NA node receiving GM node information and accessing the GM node to transfer collected monitoring information; and when the GM node is not present in the group, selecting the requesting NA node as a new GM node and transferring the monitoring information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings.

Figure 1:
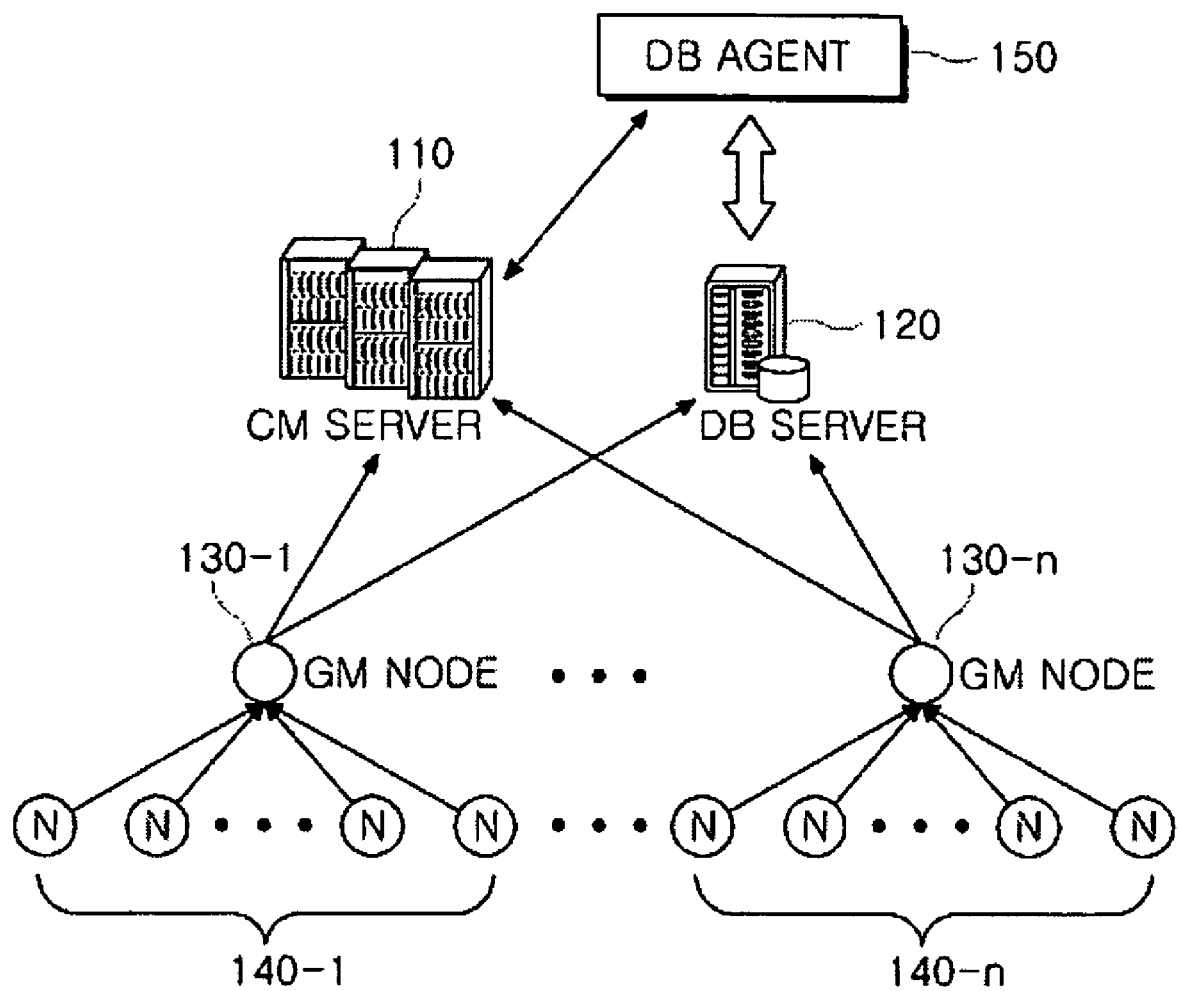
FIG. 1 is a schematic diagram of a large-scale cluster monitoring system according to an embodiment of the present invention.

FIG. 1 is a schematic diagram of a large-scale cluster monitoring system according to an embodiment of the present invention.

Referring to FIG. 1, a large-scale cluster monitoring system according to an embodiment of the present invention includes: a cluster master (CM) server 110 for managing nodes of a cluster environment; a database (DB) server 120 for storing monitoring information, i.e., state information of nodes in groups; a plurality of group master (GM) nodes 130-1 through 130-n for respectively collecting the monitoring information, which is the state information of the nodes in the corresponding groups, to store the collected monitoring information in the DB server 120; a plurality of node agent (NA) nodes 140-1 through 140-n for respectively collecting the state information of the nodes in the corresponding groups to transfer the collected state information to the corresponding GM nodes 130-1 through 130-n; and a DB agent 150 for monitoring the monitoring information of the nodes in the groups, which is stored in the DB server 120, to detect any possible node failure.

The CM server 110 manages nodes in a large-scale cluster system in totality. The CM server manages NA node information, GM node information, and group information in the large-scale cluster system. When a GM node has failed, the CM server 110 assigns an NA node as a new GM node to replace the failed GM node. The CM server 110 checks whether a pre-existing GM node, which is reported to have failed, has actually failed. If the pre-existing GM node has actually failed, the CM server 110 assigns a new NA node as a new GM node to replace the failed GM node. Thereafter, when a node requesting GM node information is present in the corresponding group, the CM server 110 notifies newly-set (or updated) GM node information to the requesting node.

The GM nodes 130-1 through 130-n set each subnet as each group and set one of nodes in each group as a GM node, in a large-scale GM cluster environment. Each of the GM nodes 130-1 through 130-n receives monitoring information, i.e., node state information from an NA node server in the corresponding group, and accesses the DB server 120 to store the received monitoring information in the DB server 120.

The NA nodes 140-1 through 140-n collect monitoring data being state information of the nodes in the corresponding groups, and transfers the collected monitoring data to the corresponding GM nodes 130-1 through 130-n. In a boot mode, because the NA nodes 140-1 through 140-n do not know GM node information, they access the CM server 110 to obtain GM node information. Upon the obtainment of the GM node information, the NA nodes 140-1 through 140-n transfer monitoring information, i.e., node state information to the corresponding GM nodes 130-1 through 130-n.

The DB agent 150 is always executed on the DB server 120, and periodically checks information of the DB server 120. If monitoring information of a node is not updated during a certain time, the DB agent 150 determines that the node has failed, and transfers information of the failed node to the CM server 110 to rapidly handle the node failure.

Figure 2:
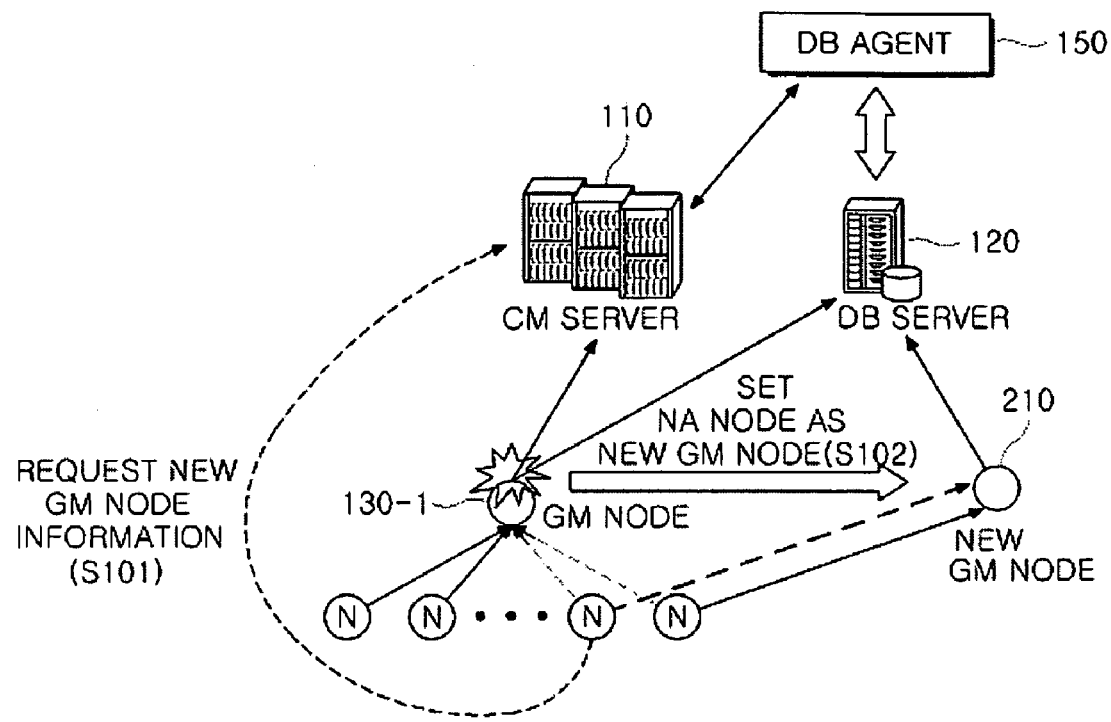
FIG. 2 is a diagram illustrating a method for automatically processing a GM node failure in the large-scale cluster monitoring system according to an embodiment of the present invention.

FIG. 2 is a diagram illustrating a method for automatically processing a GM node failure in the large-scale cluster monitoring system according to an embodiment of the present invention.

Referring to FIG. 2, when a failure occurs in the GM node 130-1 while the NA node collects monitoring information to transfer the collected monitoring information to the GM node 130-1, the NA node fails to connect to the GM node 130-1. In this case, the NA node detects that the GM node 130-1 has failed, and then transfers failure occurrence information of the GM node 130-1 to the CM server 110 and requests new GM node information (in operation S101). At this point, the CM server 110 checks whether the GM node 130-1 has actually failed. When the GM node 130-1 has actually failed, the CM server 110 sets the first-requesting NA node as a new GM node to replace the failed GM node 130-1 (in operation S102). Thereafter, the new GM node 210 operates normally and the remaining NA nodes in the group connect to the new GM node 210 to form a now group, and hence a large-scale cluster system can be built rapidly and stably even when a failure occurs in the other GM nodes 130-2 through 130-n.

Figure 3:
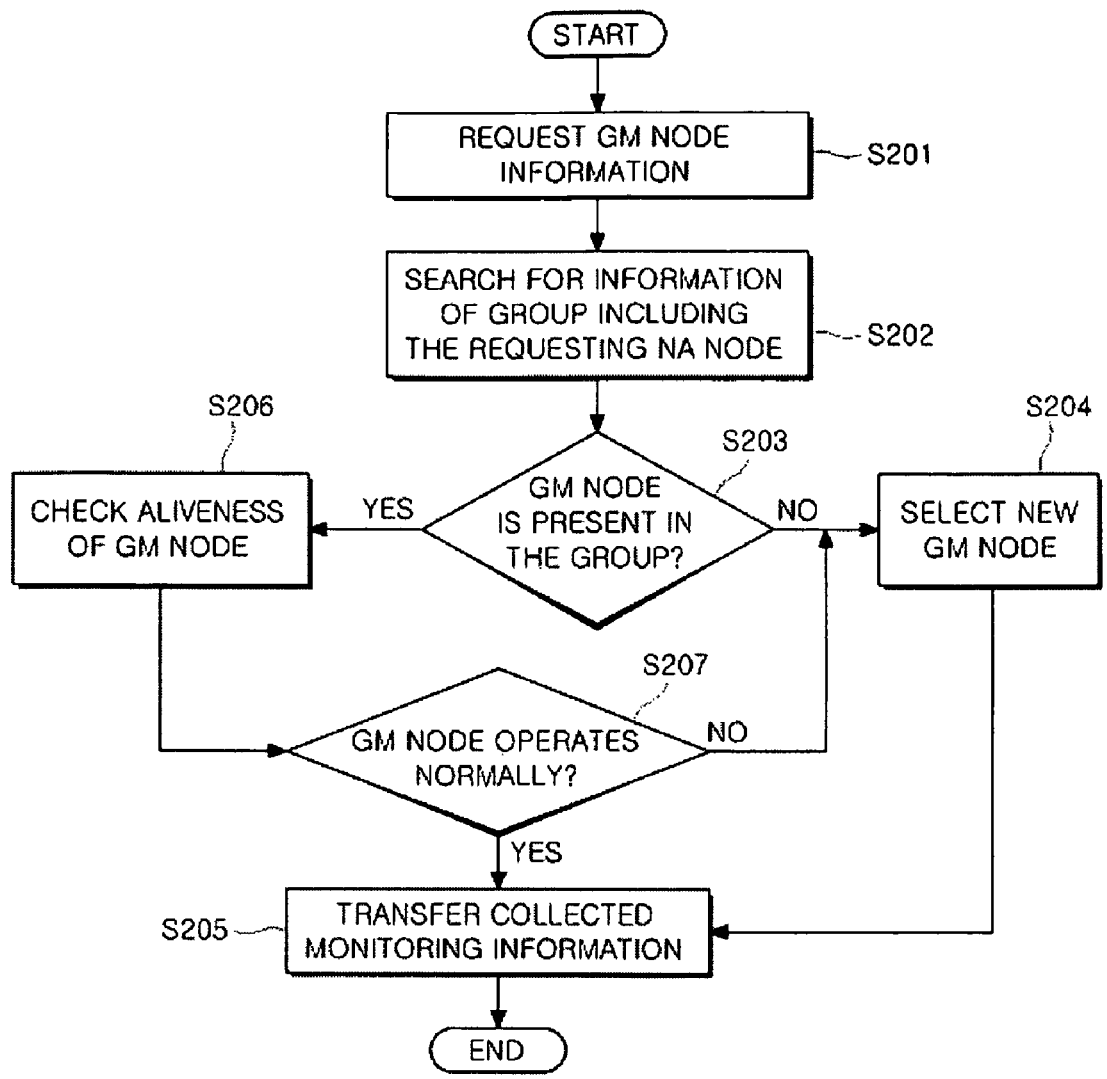
FIG. 3 is a flowchart illustrating a method for obtaining GM node information in the large-scale cluster monitoring system in a boot mode of the NA node according to an embodiment of the present invention.

FIG. 3 is a flowchart illustrating a method for obtaining GM node information in the large-scale cluster monitoring system in a boot mode of the NA node according to an embodiment of the present invention.

Referring to FIG. 3, when an NA node is initially booted and executed, the NA node accesses the CM server 110 to request GM node information because it does not know GM node information (in operation S201). In response to the GM node information request, the CM server 110 searches for information of a group including the NA node which has requested the GM node information (in operation S202).

The CM server determines whether the GM node is present in the group (in operation S203). If the GM node is not present in the group (in operation S203), the CM server 110 selects the requesting NA node as a new GM node (in operation S204). Further, the CM server 110 notifies the GM node information to the requesting NA node, and the requesting NA node accesses a GN node to transfer collected monitoring information (in operation S205).

If the GM node is present in the group (in operation S203), the CM server 110 checks whether the GM node is alive (in operation S206), and determines whether the GM node operates normally (in operation S207). If the GM node does not operate normally (in operation S207), the CM server 110 proceeds to operation S204 of selecting GM node.

If the GM node operates normally (in operation S207), the CM server 110 proceeds to operation S205 of transferring the collected monitoring information.

Figure 4:
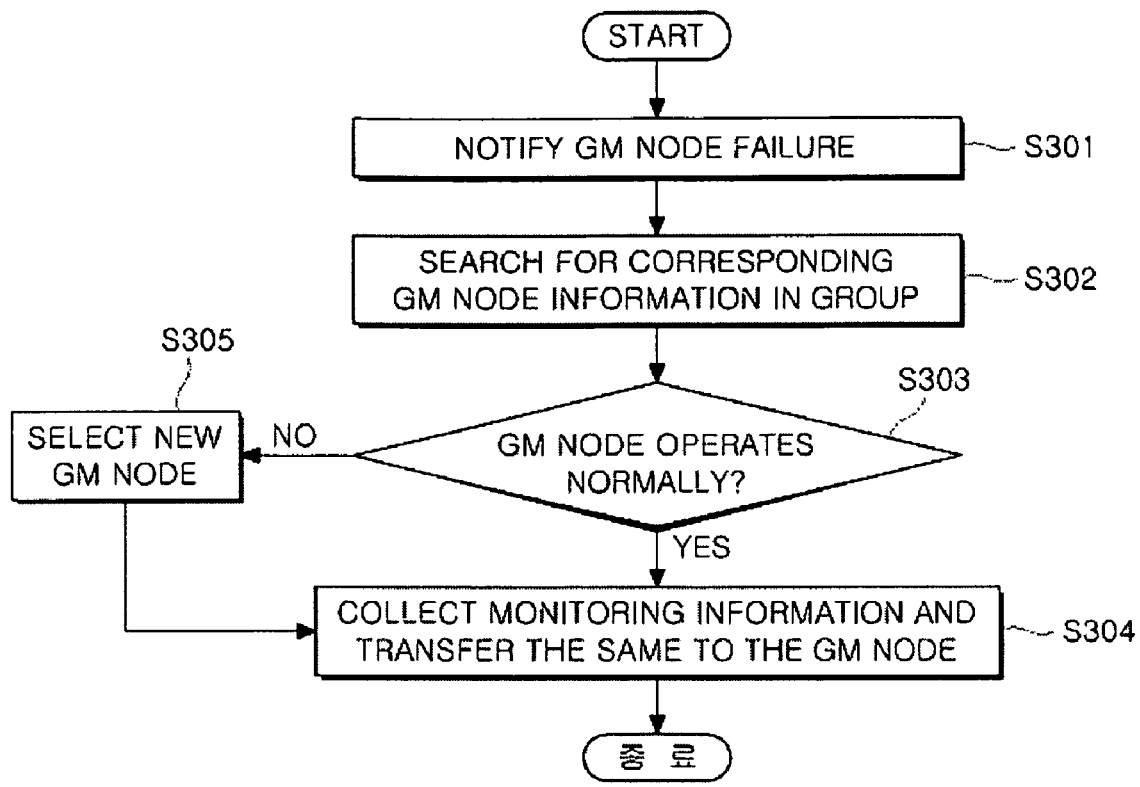
FIG. 4 is a flowchart illustrating a method for processing a GM node failure detected by an NA node in the large-scale cluster monitoring system according to an embodiment of the present invention.

FIG. 4 is a flowchart illustrating a method for processing a GM node failure detected by an NA node in the large-scale cluster monitoring system according to an embodiment of the present invention.

Referring to FIG. 4, when a failure occurs in a GM node, a connection between the GM node and an NA node is interrupted. The NA node detects the connection interruption, and accesses the CM server 110 to notify a failure in the GM node (in operation S301).

At this time, the CM server 110 searches for group information of the requesting NA node to search for the corresponding GM node information in the group (in operation S302). Further, the CM server 110 determines whether the GM node operates normally (in operation S303). If the GM node operates normally (in operation S303), the CM server 110 notifies GM node information to the requesting NA node. Then, the NA node accesses the GM node, collects monitoring information, and transfers the collected monitoring information to the GM node (in operation S304).

If the GM node does not operate normally (in operation S303), the CM server 110 selects the NA node, which has notified the GM node failure, as a new GM node (in operation S305), and thereafter proceeds to operation S304 of collecting and transferring monitoring information.

Figure 5:
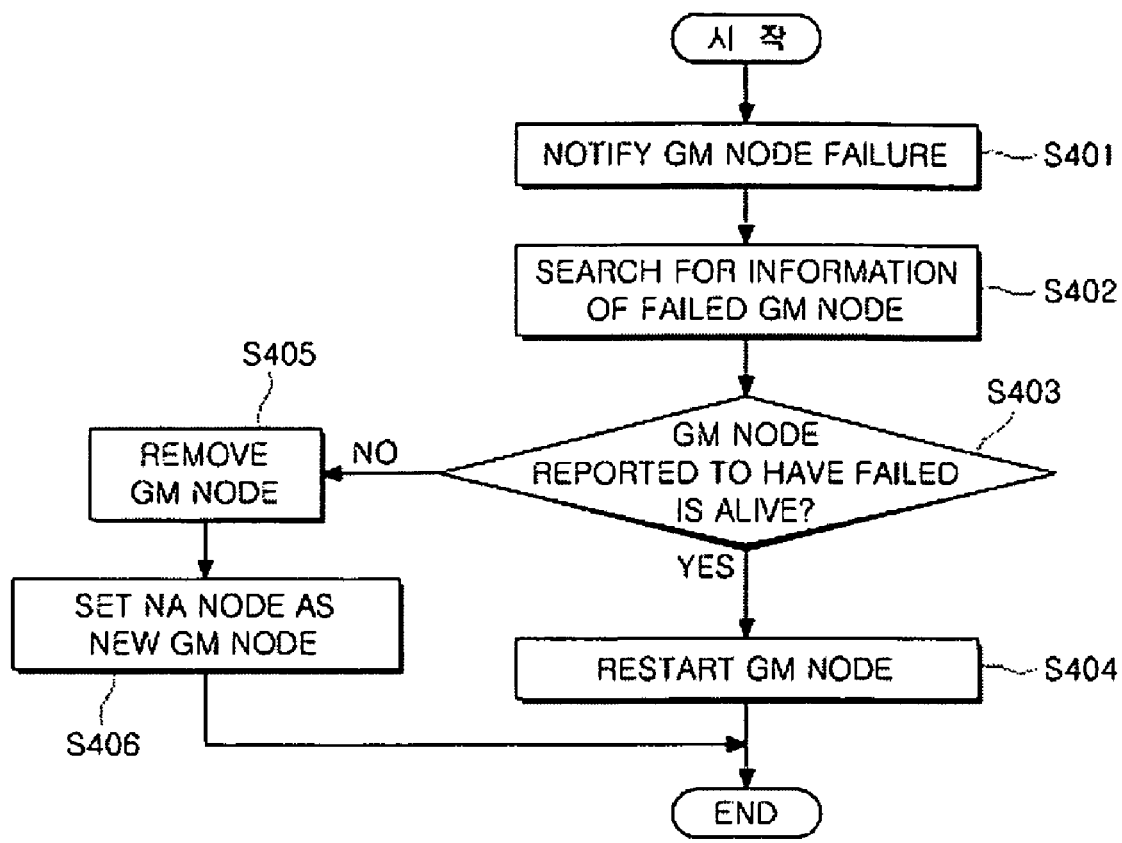
FIG. 5 is a flowchart illustrating a method for processing a GM node failure detected by the DB agent in the large-scale cluster monitoring system according to an embodiment of the present invention.

FIG. 5 is a flowchart illustrating a method for processing a GM node failure detected by the DB agent in the large-scale cluster monitoring system according to an embodiment of the present invention.

Referring to FIG. 5, if a GM node failure occurs while the DB agent 150 periodically checks monitoring information, the DB agent 150 transfers the failure information to the CM server 110 (in operation S401). Therefore, the CM server 10 searches for information of a GM node reported to have failed (in operation S402).

At this time, the CM server 110 determines whether the GM node reported to have failed is alive (in operation S403). If the GM node reported to have failed is alive and only a GM processor has failed (in operation S403), the CM server 110 restarts the GM node (in operation S404).

If the GM node reported to have failed is not physically alive (in operation S403), the CM server 110 removes the GM node (in operation S405) and sets one of NA nodes in a group as a new GM node (in operation S406).

Figure 6:
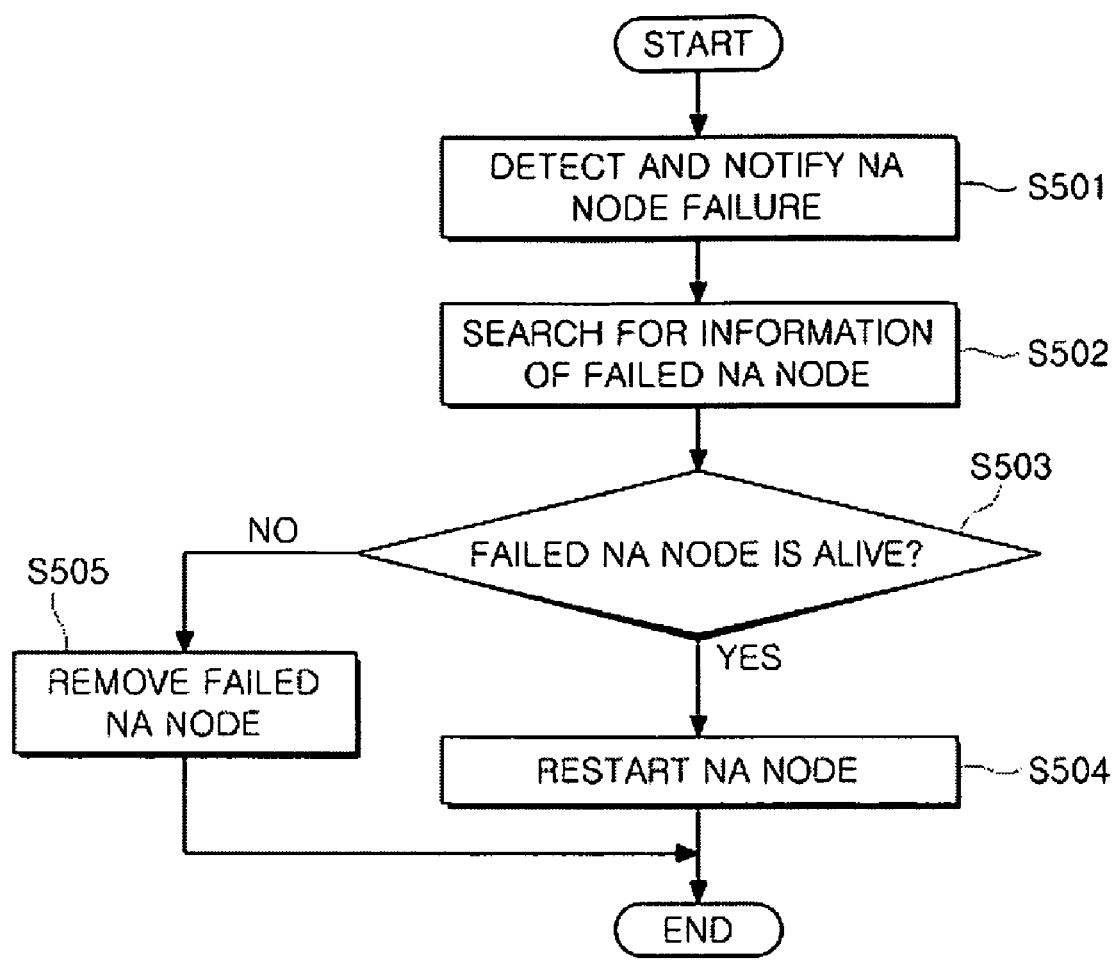
FIG. 6 is a flowchart illustrating a method for processing an NA node failure detected by the DB agent in the large-scale cluster monitoring system according to an embodiment of the present invention.

FIG. 6 is a flowchart illustrating a method for processing an NA node failure detected by the DB agent in the large-scale cluster monitoring system according to an embodiment of the present invention.

Referring to FIG. 6, the DB agent 150 detects an NA node failure and notifies the NA node failure to the CM server 110 (in operation S501). Then, the CM server 110 searches for information of the failed NA node (in operation S502).

At this time, the CM server 110 determines whether the failed NA node is physically alive (in operation S503). If the failed NA node is alive (in operation S503), the CM server 110 restarts the NA node (in operation S504).

If the failed NA node is not physically alive (in operation S503), the CM server 110 removes the failed NA node (in operation S505).

As described above, the present invention can actively handle configuration information at a node failure, thereby increasing the availability of a cluster system.

Also, the present invention can stably build a monitoring system even when a failure occurs in an upper node collecting the monitoring information of lower nodes, thereby increasing the availability of a cluster system.

Also, the present invention can automatically build a monitoring system structure that forms groups in a large-scale cluster system in units of subnets, selects one of nodes as a group master node, connects the remaining nodes to the group master node, and transfers monitoring information to the upper node.

Also, the present invention can transfer monitoring information of a monitoring system to an upper node rapidly and smoothly when a failure occurs in a node agent node or a group master node, thereby increasing the availability of a large-scale cluster system.

Also, the present invention can automatically construct/manage nodes of a cluster environment without the intervention of an operator when a failure occurs in nodes collecting monitoring information in a large-scale cluster environment, thereby increasing the availability of nodes.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for automatically building and restoring a large-scale cluster monitoring system, the method comprising:

when a failure occurs in a group master (GM) node, transferring the GM node failure information through a database (DB) agent;

searching for information of the GM node reported to have failed;

when the GM node reported to have failed is alive, restarting the GM node; and when the GM node reported to have failed is not physically alive, removing the GM node and setting one of node agent (NA) nodes in a group as a new GM node, wherein the GM node is restarted when the GM node reported to have failed is alive and only a GM processor has failed.

* * * * *